United States Patent [19]
Stein

[11] Patent Number: 5,458,775
[45] Date of Patent: Oct. 17, 1995

[54] FILTRATION APPARATUS FOR SEPARATING SOLIDS FROM LIQUID CONTAINING SAME

[75] Inventor: Peter Stein, Caracas, Venezuela

[73] Assignee: Grana, Inc., New York, N.Y.

[21] Appl. No.: 226,963

[22] Filed: Apr. 13, 1994

Related U.S. Application Data

[63] Continuation-in-part of Ser. No. 922,997, Jul. 30, 1992, Pat. No. 5,136,685.

[51] Int. Cl.$^6$ .................. B01D 33/067; B01D 33/11
[52] U.S. Cl. .................. 210/373; 210/360.1; 210/372; 210/380.1; 210/391; 210/512.1; 210/781; 210/787; 426/489; 494/36
[58] Field of Search .................. 210/360.1, 372, 210/373, 380.1, 380.3, 391, 396, 512.1, 781, 789; 426/489; 494/36

[56] References Cited

U.S. PATENT DOCUMENTS

| | | | |
|---|---|---|---|
| 3,864,256 | 2/1975 | Hultsch et al. | 210/360.3 |
| 4,518,621 | 5/1985 | Alexander | 210/380.3 |
| 4,998,898 | 2/1985 | Haggett | 494/24 |
| 5,183,568 | 2/1993 | Lescovich | 210/360.1 |

*Primary Examiner*—Robert A. Dawson
*Assistant Examiner*—David Reifsnyder
*Attorney, Agent, or Firm*—Cooper & Dunham

[57] ABSTRACT

A method and apparatus for separating solids from liquid containing same comprises a conical-mesh which rotates within a casing about a vertical axis with the mesh walls upwardly diverging. A liquid-solid slurry is introduced to the center of the mesh at a top inlet. Stationary wiper arms in the center of the mesh, along with fluid pressure inside the mesh, pumping effect of the rotating blades, gravity force on the slurry and tangential pump suction at the bottom drive the liquid out through the mesh, while the solid material passes down through a central outlet opening in the bottom of the mesh.

16 Claims, 3 Drawing Sheets

FILTRATION APPARATUS FOR SEPARATING SOLIDS FROM LIQUID CONTAINING SAME

This is a continuation-in-part of U.S. Ser. No. 07/922, 997, filed Jul. 30, 1992, now U.S. Pat. No. 5,136,685.

BACKGROUND OF THE INVENTION

The present invention is directed to a method and apparatus for separating solids, such as solid particles (e.g. seeds) from a liquid containing same.

In the processing of slurries, it is often desired to separate the solid particles or material from the liquid. In the processing of seeds for example, the seeds may be washed and then the water must be removed. The present invention is directed to novel arrangement for separating the solids from the liquid, particularly in a continuous process in a highly efficient manner and with high throughput.

SUMMARY OF THE INVENTION

In accordance with the present invention a continuously operated separator is provided for liquids and solids wherein a slurry of liquid and solid particles are introduced into a rotary conical screen mesh. Through the operation of radial wiper blades which conform to the inside surface of the rotary conical screen mesh, the solids and liquid are separated as they move downward through the conical mesh, with the liquid squeezed out through and to the outside of the mesh and with the solids leaving the conical mesh screen at an outlet in the bottom. The separated liquid may be returned or recycled and the squeezed-out particles, such as seeds or grains, may be dumped into a collector tank for further processing, such as rinsing or drying.

In particular, according to one aspect of the invention, the invention provides an apparatus for separating solids from liquid in a liquid-solid slurry, comprising a separator comprising a separator mesh means having a frusto-conical shape with upwardly diverging, walls, a top inlet, a bottom outlet, an axis and generally open center, means for rotating the separator generally about its central axis, means for wiping the inside mesh wall of the mesh means during rotation thereof, and means for introducing a liquid-solid slurry into the center of the separator through the top inlet, whereby the slurry will be squeezed to cause liquid to pass through the mesh means and to cause solids to collect and pass through the bottom outlet.

The apparatus preferably includes a casing around said separator, said casing having a generally cylindrical shape and a bottom, for collecting liquid after passing through the mesh means. The mesh means may comprise a mesh screen, or a perforated plate formed into a frusto-conical shape. The means for wiping preferably extends from the inlet top to the outlet bottom and wipes the inside mesh wall on at least two locations along the mesh wall simultaneously, by way of brushes.

Pump means may be provided for introducing the slurry under pressure. After the liquid passes through the mesh means, and is collected, it may be added to the slurry.

The separator preferably comprises a plurality of bars spaced around and engaging the exterior of the mesh means, and a plurality of plates on the interior of the mesh means connected through the mesh means each to a different respective bar, to support the mesh means. The separator also preferably comprises a top circumferential ring and a bottom circumferential ring, and a plurality of radial blades connected to the respective top and bottom rings.

The means for rotating comprises an upper support and a lower support each connected respectively to the top and bottom of the separator through respective ball bearing assemblies, which are preferably conic.

The separator may be rotated at a constant speed. The solids in the slurry may be seeds, grains or other particles.

According to another aspect of the invention, the invention provides a method of separating solids from liquid in a liquid-solid slurry, comprising rotating a separator mesh having a frusto-conical shape with upwardly diverging walls generally about its central axis, wiping the inside wall of the separator mesh during rotation, and introducing a liquid-solid slurry into the center of the rotating separator mesh, whereby liquid will pass through the mesh and solids will pass through the bottom of the separator mesh.

The slurry is preferably introduced under pressure. The liquid is preferably collected after passage through the mesh and added to the slurry.

The inside wall is preferably wiped from the top to the bottom of the separator mesh, and is wiped at least two circumferential locations simultaneously.

The separator may be rotated at a constant speed. The solids in the slurry may be seeds, grains or other particles.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

DETAILED DESCRIPTION OF THE PREFERRED EMBODIMENT

Figure 1:
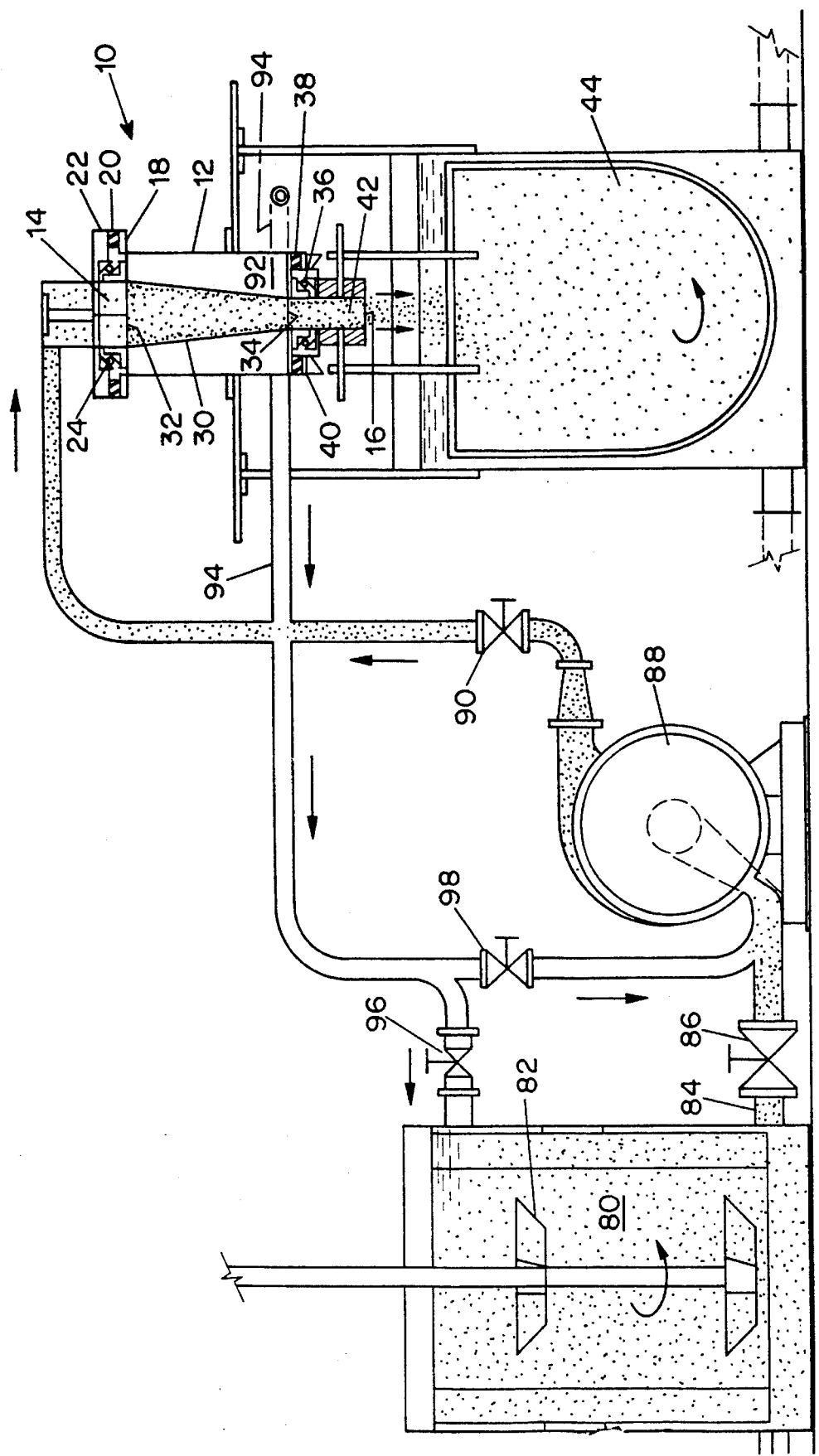
FIG. 1 is an elevational view, in partial cross-section, of a separator system according to the invention.

As shown in FIG. 1, a separator 10 according to the present invention comprises a squeezer body or cylindrical casing 12 having a cylindrical shape but having a top circular opening 14 and a bottom circular opening 16. The casing has an upper peripheral flange 18 upon which rests packing material 20, on top of which is a cover 22, which together protect a top conical bearing 24 from liquids and slurry.

Located for rotational movement inside the casing 12 is a separator element in the form of conical mesh 30 or more aptly a frusto-conical mesh, having upwardly diverging walls, a top inlet opening 32 and a bottom outlet opening 34. The conical mesh is aligned with the top and bottom openings in the casing. The conical mesh 30 is rotatably coupled to the casing at the top by means of the first top conical bearing 24, and at the bottom by means of a second conical bearing 36. A packing 28 and bottom cover 40 provide a means to protect the bottom bearing from slurry, liquids or solids, in a manner similar to a corresponding arrangement for the top bearing. Further means to protect the sealing of the bearing is provided by suction of a suction pump (to be described below) at the discharge outlet.

The apparatus may be operated in a pump mode or a turbine mode. A belt and suitable drive means (not shown in FIG. 1) may provide rotational force in case of pump mode operation to rotate the conical mesh within the casing 12. In case of turbine mode it is the inlet hydraulic energy and the suction of the suction pump that provide the energy for rotation.

At the bottom of the conical mesh 30 is a cylindrical outlet or discharge chute 42, and below the chute is a collector 44, which, as will be described more fully below, collects solid material for rinsing, drying or other processing.

A segment of pipe 48 welded to the bottom of, and having the same diameter as, the discharge chute pipe 46 has slots 48a around its circumference, and a bracket or adjustable diameter clamp 48b allows regulation of the resistance of the material outflow by adjusting the clamp. Thus, by tightening the clamp, the circumference becomes smaller, providing increased outflow resistance.

Figure 2:
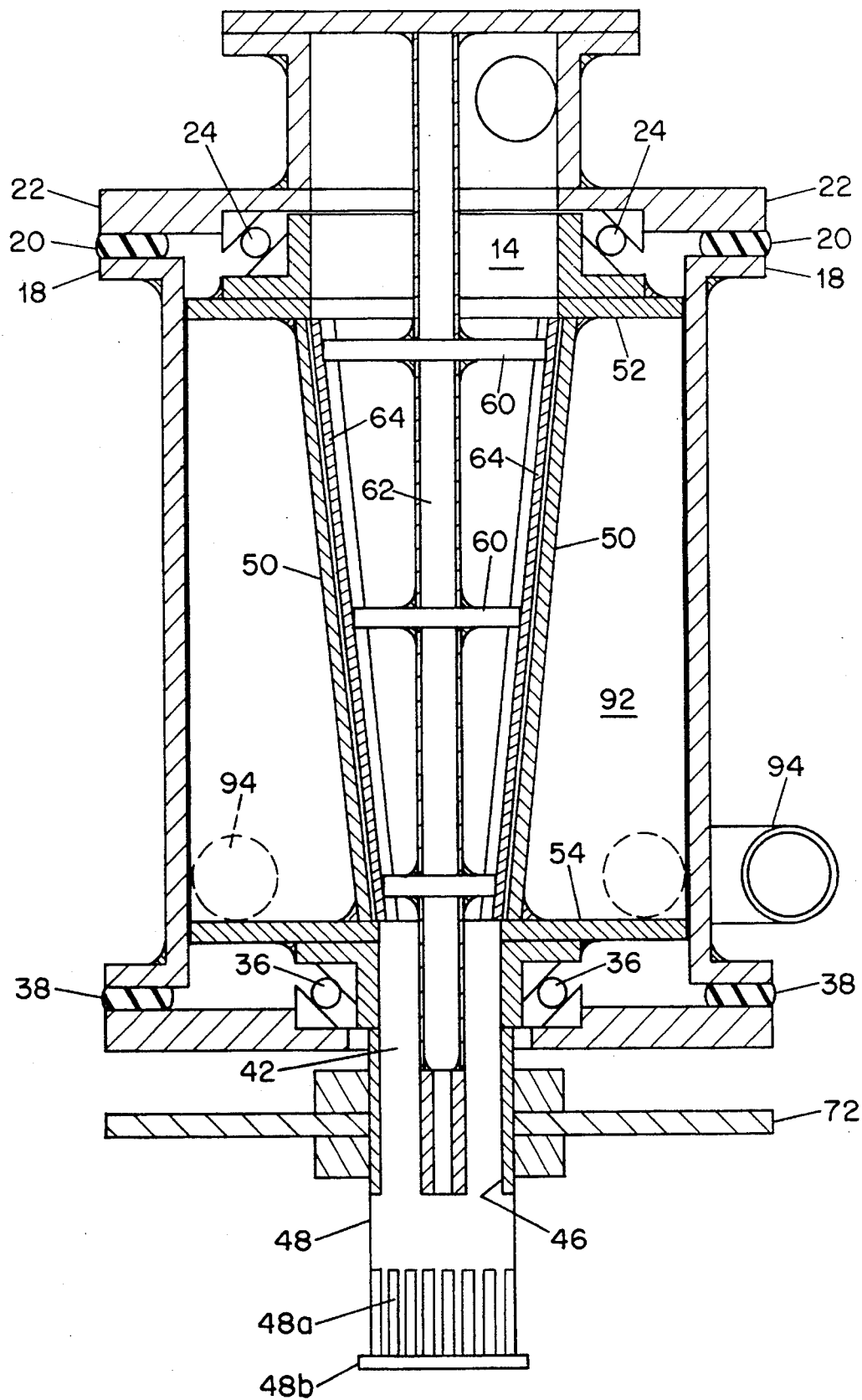
FIG. 2 is an elevational view, in cross-section, of a separator forming part of the system of FIG. 1, showing the separator in more detail.
Figure 3:
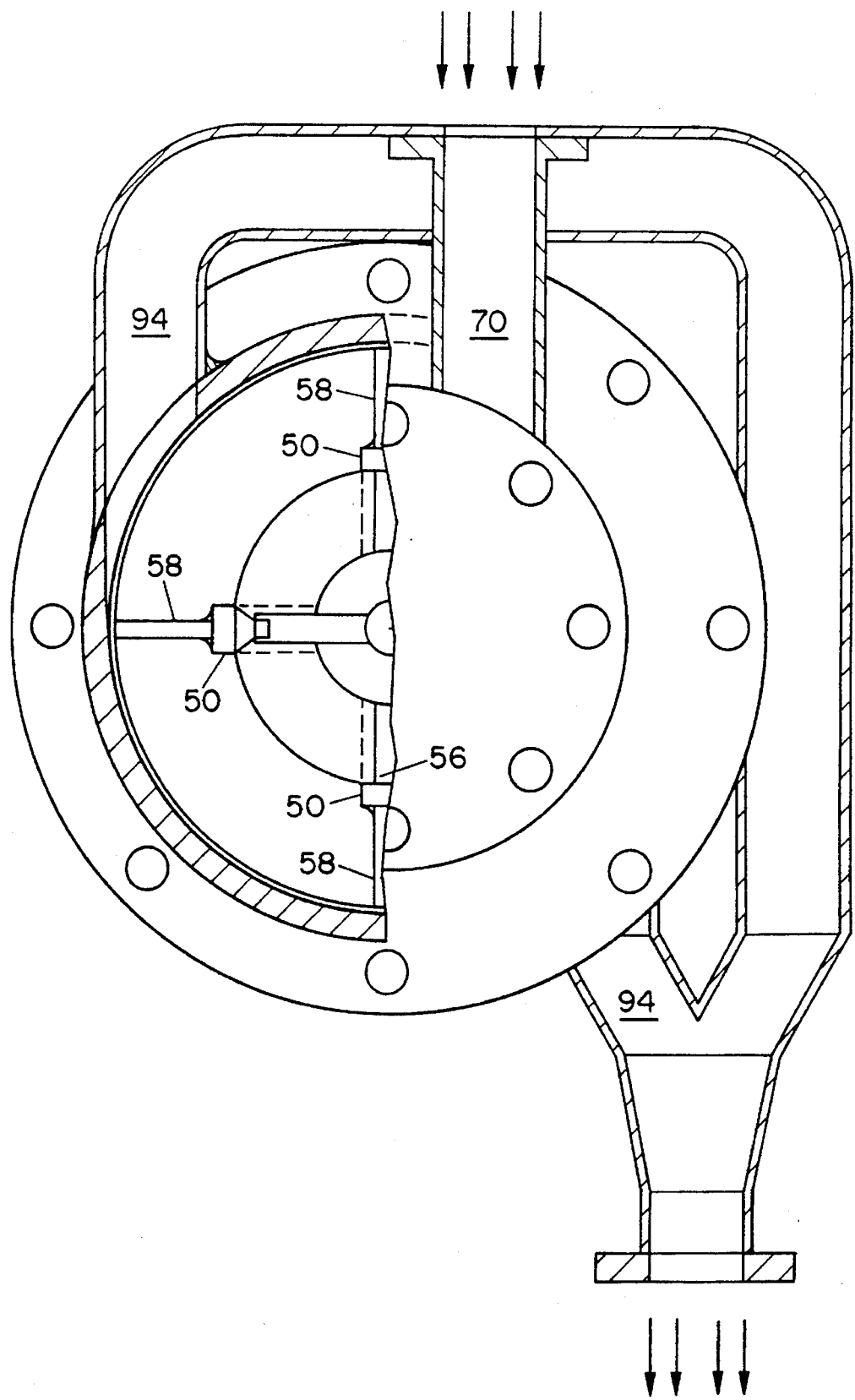
FIG. 3 is a top plan view, in partial cross-section, of the separator of FIG. 2.

The mesh 30 may be made of a metal mesh-like fabric or may be a perforated plate. As shown in FIGS. 2 and 3, to avoid stress concentrations on the mesh, especially if the mesh is fabric or tissue, a support structure is provided, by way of four mesh support bars 50 along the outer conical surface, welded at 90° from each other, to a top disc 52 and bottom disc 54. The mesh is sandwiched between the mesh support bars 50 (which are on the outside of the mesh) and relatively thin mesh pressing plates 56 (which are on the inside of the mesh). The bars 50 and plates 52 are held together by screws. Four radial blades 58 are welded at 90° from each other at four circumferential locations around the casing 12. The blades are connected at their inner radial extent to the bars 50. The preferred material for the mesh is stainless steel, to avoid rusting.

The mesh 30 forms the inner conical boundary and has a mesh clearance size selected in accordance with the size of the solid particles to be squeezed out axially at the bottom outlet of the cone. It may be necessary or desirable to obtain a size-distribution study of the particles of interest to select the best size of the mesh clearance for maximum efficiency. Two or more conical meshes with different mesh clearance sizes may be provided if the particles, and thus the sizes, are not homogeneous.

Stationary wiper arms 60 are provided at 90° spaced apart locations extending radially outwardly from stationary wiper support 62 and have at their outward radial extent wiper brushes 64. Instead of the wiper brushes, a trapezoidal rubber sheet pressed sandwichwise between two static and thin trapezoidal steel plates may be provided, the plates being slightly smaller than the rubber sheet, so that the rubber sheet extends beyond the steel plates and engages the inner conical surface. The wiper brushes, being stationary in relation to the rotating mesh 30, act as a sweeper to remove particle build-up inside the mesh 30 to enable free passage of liquid outwardly. The wiper structure is secured by screws to the top cover, so that the cone mesh rotates outside the stationary wipers and inside the casing. The wipers may also thus be easily removed. The number of blades may be increased (up to 8–12 wipers, for example,) in large squeezers. A water/solid particle slurry is injected into the interior of the conical mesh 30 by means of a pipe 70 tangentially welded to the top cover. By providing slurry tangentially under pressure a rotational force is imparted to the conical mesh 30 to rotate the mesh in the turbine mode of operation.

For better understanding which parts rotate and which parts are stationary, in FIG. 2, the stationary elements are shown with cross-hatching lines from the upper right to the lower left, and the rotating cone and associated rotating structure is shown with cross-hatching lines from the upper left to the lower right. FIG. 2 at its lower region shows a torque disk 100 which is coupled to a drive means to provide rotational force to rotate the conical mesh, in case of pump operation mode.

Returning now to FIG. 1, a source tank 80 receives a slurry of liquid and solid material and stirs the slurry with a stirrer 82. The slurry leaves the source tank at an outlet 84 through valve 86 and is provided at the inlet of a slurry pump 88. The pump thus causes a squeezing pressure differential between the inside of the mesh and the outside of the mesh. The slurry pump 88 pumps the slurry under pressure through a control valve 90 to the top of the conical mesh where it is driven downward both by gravity and the pressure from the pump 88. The pump 88 also provides the inlet hydraulic energy to rotate the conical mesh 30, in the turbine mode of operation. The rotation of the conical mesh 30, aided by the action of the internal wiper arms 60 and brushes 64 wiping the inside walls of the conical mesh drive the liquid outwardly through and to the exterior of the conical mesh liquid into collection region 92. The solid material is driven downward out of the outlet in the bottom of the conical mesh into the solid particle collector.

The casing in its outer peripheral liquid collection region 92 collects the liquid expelled through the mesh. Two diametrically opposed outlet pipes 94 are connected to the bottom of the casing (such as by welding them tangentially to the casing). The slurry pump 88 provides suction to draw the water out of the outlet pipes, which further contributes rotational force to rotate the mesh 30. The suctioned water is provided to the source tank through suction control valve 96, and to the inlet of the slurry pump 88 through the pump inlet control valve 98.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An apparatus for continuously separating solids from liquid in a liquid-solid slurry, comprising a separator comprising a separator mesh means having a frusto-conical shape having a top and bottom with upwardly diverging mesh walls having inner and outer sides extending from the top to the bottom, a top inlet, a bottom outlet, a central axis and generally open center, said axis being arranged generally vertically, said mesh having a mesh clearance smaller than the size of the solids;

means for continuously rotating the separator generally about its central axis;

stationary wiper means for tangentially wiping the inner side of the mesh wall of the mesh means during rotation thereof; and means for creating a squeezing pressure differential between the inside of the mesh and the outside of the mesh by pumping the slurry under pressure into the inside of the mesh and suctioning the liquid out of the outside of the mesh;

whereby the pressure differential will cause rotation of the mesh, which with the wiping action of the inner mesh wall during continuous rotation and the force of gravity on the slurry will be squeezed to cause liquid to pass through the mesh means and to cause solids to pass through the bottom outlet.

2. The apparatus according to claim 1, further comprising a casing around said separator, said casing having a generally cylindrical shape and a bottom, for collecting liquid after passing through the mesh means.

3. The apparatus according to claim 1, wherein the mesh means comprises a mesh screen.

4. The apparatus according to claim 1, wherein the mesh means comprises a perforated plate formed into a frusto-conical shape.

5. The apparatus according to claim 1, wherein the means for wiping extends from the inlet top to the outlet bottom.

6. The apparatus according to claim 1, wherein the means for wiping comprises means for wiping the inside mesh wall on at least two circumferential locations along the mesh wall simultaneously.

7. The apparatus according to claim 1, wherein the means for wiping comprises a brush.

8. The apparatus according to claim 1, wherein the means for creating a squeezing pressure differential comprises pump means for introducing the slurry under pressure.

9. The apparatus according to claim 1, including means for adding liquid to the slurry after the liquid passes through the mesh means.

10. The apparatus according to claim 1, wherein the separator comprises a plurality of bars spaced around and engaging the exterior of the mesh means, and a plurality of plates on the interior of the mesh means connected through the mesh means each to a different respective bar, to support the mesh means.

11. The apparatus according to claim 1, wherein the separator comprises a top circumferential ring and a bottom circumferential ring, and a plurality of radial blades connected to the respective top and bottom rings.

12. The apparatus according to claim 1, wherein the means for rotating comprises an upper support and a lower support each connected respectively to the top and bottom of the separator through respective ball bearing assemblies.

13. The apparatus according to claim 12, wherein the ball bearing assemblies are conic.

14. The apparatus according to claim 1, wherein the means for rotating the separator comprises means for rotating the separator at a constant speed.

15. The apparatus according to claim 1, wherein the solids in the slurry are seeds.

16. The apparatus according to claim 1, further comprising means for adjusting the size of the bottom outlet.

* * * * *